US006033624A

United States Patent [19]
Gonsalves et al.

[11] Patent Number: 6,033,624
[45] Date of Patent: Mar. 7, 2000

[54] METHODS FOR THE MANUFACTURING OF NANOSTRUCTURED METALS, METAL CARBIDES, AND METAL ALLOYS

[75] Inventors: Kenneth E. Gonsalves; Sri Prakash Rangarajan, both of Storrs, Conn.

[73] Assignee: The University of Conneticut, Storrs, Conn.

[21] Appl. No.: 08/719,228

[22] Filed: Sep. 25, 1996

Related U.S. Application Data

[63] Continuation-in-part of application No. 08/389,778, Feb. 15, 1995, Pat. No. 5,589,011.

[51] Int. Cl.[7] ...................................................... B22F 3/00
[52] U.S. Cl. ................................ 419/48; 419/13; 419/19; 419/23; 75/343; 75/351; 75/362
[58] Field of Search ............................. 75/228, 246, 343, 75/351, 362; 419/13, 19, 23, 48

[56] References Cited

U.S. PATENT DOCUMENTS

| | | |
|---|---|---|
| 2,674,528 | 4/1954 | Beller et al. . |
| 2,776,200 | 1/1957 | Wallis . |
| 2,938,781 | 5/1960 | Schmeckenbecher . |
| 3,494,760 | 2/1970 | Ginder . |
| 3,620,714 | 11/1971 | Short . |
| 3,694,188 | 9/1972 | Llewelyn et al. . |
| 3,711,274 | 1/1973 | Montino et al. . |
| 4,056,386 | 11/1977 | McEwan et al. . |
| 4,652,305 | 3/1987 | Ebenhoech et al. . |
| 4,808,216 | 2/1989 | Kageyama et al. . |
| 4,909,840 | 3/1990 | Schlump ................................. 75/232 |
| 5,064,464 | 11/1991 | Sawada et al. ........................ 75/347 |
| 5,085,690 | 2/1992 | Ebenhoech et al. .................... 75/362 |
| 5,128,081 | 7/1992 | Siegel et al. ............................ 264/81 |
| 5,147,446 | 9/1992 | Pechenik et al. ...................... 75/230 |
| 5,147,449 | 9/1992 | Grewe et al. .......................... 75/354 |
| 5,149,381 | 9/1992 | Grewe et al. .......................... 148/513 |
| 5,173,454 | 12/1992 | Rittler .................................... 501/5 |
| 5,352,266 | 10/1994 | Erb et al. ............................... 75/300 |
| 5,395,422 | 3/1995 | Schulz et al. .......................... 75/255 |
| 5,433,797 | 7/1995 | Erb et al. ............................... 148/304 |
| 5,456,986 | 10/1995 | Majetich et al. ....................... 428/403 |
| 5,460,701 | 10/1995 | Parker et al. .......................... 204/164 |
| 5,549,973 | 8/1996 | Majetich et al. ....................... 428/403 |

OTHER PUBLICATIONS

Pp. 220–236 of Chapter 15 from *Preparation and Characterization of Nanophase Iron and Ferrous Alloys* ©1996.
3 pages from article titled Sonochemical synthesis and charaterization of nanostructured iron and its alloys from Journal of Materials Science Letters 15 (1996) 1261–1263.

*Primary Examiner*—Ngoclan Mai
*Attorney, Agent, or Firm*—Cantor Colburn LLP

[57] ABSTRACT

Methods for the manufacture of nanostructured metals, metal carbides, and metal alloys are presented, such metals including nanostructured aluminum, chromium, iron, molybdenum, vanadium, and steel. Preferably, the nanostructured steel is of the M50 type, and comprises iron, molybdenum, chromium, vanadium and carbon. Synthesis of M50 steel further comprising nanostructured aluminum, aluminum oxide, or aluminum nitride is also described. In accordance with an important feature of this invention, the grain size of the metals and metal alloys is in the nanometer range. In accordance with the method of the present invention, the nanostructured metals, metal carbides, and metal alloys are prepared via chemical synthesis from aluminum, iron, molybdenum, chromium and vanadium starting materials. Decomposition of metal precursors or co-precipitation or precipitation of metal precursors is followed by consolidation of the resulting nanostructured powders. Alternatively, nanostructured M50 steel may be obtained by mixing of nanocrystalline chromium, iron, molybdenum, and vanadium powders, followed by ball-milling, and consolidation. The nanostructured metals, metal carbides, and metal alloys of this invention find particular utility in the manufacture of cutting tools and bearings, and in ferrofluids, magnetic memory systems, and catalysis.

45 Claims, 16 Drawing Sheets

METHODS FOR THE MANUFACTURING OF NANOSTRUCTURED METALS, METAL CARBIDES, AND METAL ALLOYS

CROSS-REFERENCE TO RELATED APPLICATION

This is a continuation-in-part of application Ser. No. 08/389,778 filed Feb. 15, 1995, now U.S. Pat. No. 5,589, 011.

BACKGROUND OF THE INVENTION

This invention relates generally to methods of manufacture of nanostructured materials. More particularly, this invention relates to methods of manufacture of nanostructured metals, metal carbides, and metal alloys by thermochemical and sonochemical decomposition, as well as by reduction. These synthetic schemes use readily available starting materials, of relatively low cost.

Metals, metal carbides, and metal alloys are traditionally produced by melting and casting techniques which entail some level of microstructural and chemical inhomogeneities. Recent developments in rapid solidification techniques, such as powder atomization and melt spinning, are capable of producing chemically homogeneous materials with fine microstructures. Grain sizes in micrometers are achievable by rapid solidification techniques. The microstructural refinement is usually accompanied by enhanced mechanical and physical properties. In recent years, much attention has been devoted to a further reduction of grain size from the micrometer size to the nanometer. Nanostructured materials have superior mechanical, magnetic, and other physical properties.

In particular, iron and iron-based alloys are technologically important materials in modem industry. Ultrafine iron dispersions have applications in ferrofluids, magnetic memory systems and catalysis. M50 steel (4.0% Cr, 4.5% Mo, 1.0% V, 0.8% C, with balance of Fe by weight), because of its good resistance to tempering, wear and rolling contact fatigue, has been used extensively in the aircraft industry as main-shaft bearings in gas-turbine engines. In the hardened condition, M50 steel consists of a body-centered tetragonal martensite phase and a dispersion of carbide particles including $M_{23}C_6M_6C$, $M_2C$ and MC. The grain size of the martensite is about 0.032 mm and smaller, and some of the dispersion particles are several microns in diameter. These relatively large carbide particles often act as fatigue crack initiation sites. A nanostructured M50 steel would not contain these large carbide particles. Furthermore, a nanostructured M50 steel may have improved resistance to tempering, and wear and rolling contact fatigue.

Techniques for the production of nanostructured materials include physical methods such as gas-phase condensation, metal evaporation, spray pyrolysis, laser ablation, and plasma synthesis. Chemical methods include sol-gel synthesis, electrolytic deposition, chemical vapor deposition, and laser pyrolysis. Chemical synthesis is advantageous in that it allows tailored synthesis through assembly of atomic or molecular precursors, enhanced control of stoichiometry, and mixing of constituent phases at the molecular level. Chemical synthesis are also superior in providing for faster, cost-effective production of bulk quantities of materials.

Examples of the chemical synthesis of ultrafine iron and iron-cobalt alloys have been described in U.S. Pat. No. 4,842,641 issued to Gonsalves; by Jaques van Wonterghem et al in an article entitled "Formation of a Metallic Glass by Thermal Decomposition of $Fe(CO)_5$" in *Physical Review Letters,* Vol. 55, No. 4, pages 410–413 (1985); by Jaques van Wonterghem et al in an article entitled "Formation of Ultrafine Amorphous Alloy Particles by Reduction in Aqueous Solution" in *Nature,* Vol. 322, pages 622–623 (1986); and by Kenneth E. Gonsalves and Kuttaripalyam T. Kembaiyan in an article entitled "Synthesis of Advanced Ceramics and Intermetallics From Organometallic/Polymeric Precursors" in *Solid State Ionics,* 32/33, pages 661–668 (1989). However, there are no previous reports of the chemical synthesis of a multicomponent commercial nanostructured M50 steel.

SUMMARY OF THE INVENTION

The above-discussed and other disadvantages and deficiencies of the prior art are overcome or alleviated by the methods for synthesis of nanostructured metals, metal carbides, and metal alloys of the present invention, such metals including aluminum, chromium, iron, molybdenum, and vanadium. Preferably the alloy is M50 type steel, comprising iron, chromium, molybdenum, vanadium and carbon. M50 steel further comprising nanostructured aluminum, aluminum oxide, or aluminum nitride is also described. In accordance with an important feature of the present invention, the particle size of the metals, metal carbides, and metal alloys is in the nanometer range.

In accordance with the methods of the present invention, the nanostructured metals, metal carbides, and metal alloys are obtained by chemical synthesis. Nanostructured metals, metal carbides, and metal alloy powders are formed by decomposition of the appropriate metal precursors or by co-precipitation or precipitation of the appropriate metal halides, followed by consolidation of the nanostructured powders into bulk metal or metal alloys. Alternatively, nanostructured M50 steel may be obtained by mixing of nanocrystalline chromium, iron, molybdenum, and vanadium powders, followed by ball-milling, and consolidation.

The methods of manufacture of the present invention offer many features and advantages. Chemical synthesis provides enhanced control over composition and stoichiometry, as well as improved large-scale production. The nanostructured metals, metal carbides, and metal alloys of this invention find particular utility when used as materials in bearings, such as bearings used in the aircraft industry, and in cutting tools.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
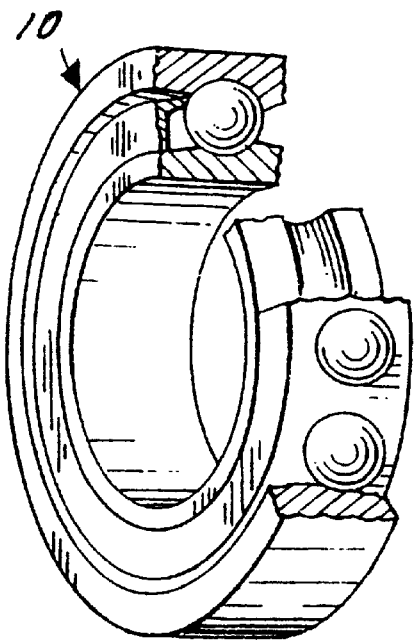
FIG. 1 is a perspective view of a bearing.

The nanostructured metal alloys of the present invention comprise iron, chromium, molybdenum, vanadium and carbon. In accordance with an important feature of this invention, the particle size of the nanostructured metal alloy is in the nanometer range. In a first embodiment of the invention, the metal alloy is a steel alloy of the M50 type, comprising iron in the range from about 80 to about 95 weight percent, chromium and molybdenum each from about 2 to about 8 weight percent, vanadium about 1 to about 3.4 weight percent, and carbon from about 0.1% to about 8% of the total composition. Preferably, the nanostructured steel alloy is M50 type steel comprising iron in the amount of 89.7 weight percent, chromium in the amount of 4 weight percent, molybdenum in the amount of 4.5 weight percent, vanadium in the amount of 1 weight percent and carbon in the amount of 0.8 weight percent of the total composition.

In accordance with a second embodiment of the invention, the alloy comprises iron in the amount of 94.2 weight percent, chromium in the amount of 0.3 weight percent, molybdenum in the amount of 0.4 weight percent, vanadium in the amount of 2.1 weight percent and carbon in the amount of 3 weight percent of the total composition.

The nanostructured metal alloys are manufactured by consolidation (compression) of nanostructured metal alloy powders. The nanostructured metal alloy powders are obtained via chemical synthesis, either by decomposition of the appropriate metal precursors, or by co-precipitation or precipitation of the appropriate metal precursors. Co-precipitation and precipitation may comprise reduction of metal halides, or reduction of a mixture of metal halides, followed by addition of a metal carbonyl.

Suitable metal precursors include, but are not limited to, metal carbonyls and ethylbenzene metal complexes. Decomposition of metal starting materials may be accomplished with an effective amount of heat or ultrasound, in solution or as an aerosol, or by a combination of heat and ultrasound. Suitable inert solvents include, but are not limited to decalin. A surfactant may be used to prevent agglomeration of the metal particles, including but not limited to polyoxyethylene sorbitan trioleate.

Suitable metal halides include, but are not limited to, metal chlorides and bromides. Suitable reducing agents include, but are not limited to, sodium borohydride in an aqueous solvent, and sodium triethylborohydride in an anhydrous solvent such as toluene. Alternatively, lithium triethylborohydride in tetrahydrofuran may be used, followed by vacuum sublimation of the powder to ro remove lithium chloride. Where co-precipitation is very rapid with concomitant formation of large amounts of hydrogen gas, the reaction process should be slowed, for example by cooling.

Suitable nanostructured metal alloy powders may be obtained via decomposition or co-precipitation of a mixture of metal starting materials, i.e., a mixture of chromium, iron, and vanadium precursors or halides. Alternatively, a suitable nanostructured metal alloy powder may be obtained via mixture of appropriate quantities of nanostructured chromium, iron, molybdenum, and vanadium powders, which are then ball-milled.

The above-described methods may also be used to produce nanostructured metal and metal carbide powders. For example, nanostructured chromium metal carbides and iron metal carbides are produced via reduction of $CrCl_3$ and $FeCl_3$, respectively. Pure chromium, molybdenum, and vanadium nanostructured powders may also be obtained by reduction of the respective metal halides. Pure iron nanopowders are obtained via either thermal or sonochemical decomposition of $Fe(CO)_5$.

In yet another embodiment of the present invention, the addition of nanostructured aluminum, aluminum oxide, or aluminum nitride powders to nanostructured M50 steel powders may improve the thermal stability of the steel compacts, or impede grain growth during consolidation and annealing. Impeding grain growth is important in maintaining the fine microstructure of the compacts and the advantageous properties that arise from such micro structures.

Nanostructured aluminum powder may be obtained by reduction of aluminum trichloride ($AlCl_3$) with a reducing agent such as lithium aluminum hydride. The synthesis of nanostructured aluminum has been described by W. E. Bunro et al. in ACS Symposium Proceedings (PMSE), August, volume 210, part 2, at page 20 (1995). Nanostructured alumina ($Al_2O_3$) powder, on the other hand, is synthesized by a sol-gel reaction wherein aluminum sec-butoxide is hydrolyzed. Synthesis of nanostructured alumina powder has been described by B. C. Gates and S. Rezgui in Chem. Mater., volume 6, page 2386 (1994). Aluminum nitride (AlN) powder is obtained by bubbling ammonia gas through a solution of aluminum trichloride hexahydrate, and heating to produce a pre-ceramic gel. Water is removed from the gel, which is then pyrolyzed at high temperature under a continuous flow of ammonia, thereby producing a nanostructured AlN powder. Synthesis of nanostructured AlN has been described by K. Gonsalves et al. in the Journal of the American Ceramic Society, volume 76, part 4, page 987 (1993).

The nanostructured powders as obtained are extremely pyrophoric. Thus, deoxygenated solvents are used in their synthesis and the reactions are carried out under a stream of argon. The powders are also stored under mineral oil for surface protection.

Referring now to FIG. 1, the nanostructured steel alloy of the present invention may be used as a bearing shown generally at 10.

Figure 2:
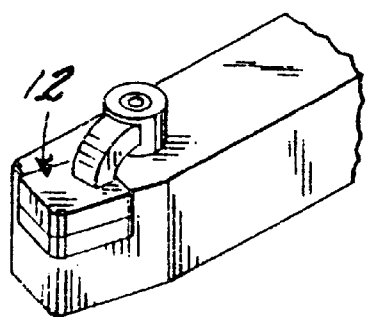
FIG. 2 is a perspective view of a cutting tool.

Referring now to FIG. 2, the nanostructured steel alloy of the present invention may be used for a cutting tool as shown generally at 12.

The following examples are provided to illustrate further the scope of the present invention; however, they should not be construed to be limitations thereof.

Materials and Methods

Iron pentacarbonyl, $Fe(CO)_5$; molybdenum carbonyl, $Mo(CO)_6$; chromium hexacarbonyl, $Cr(CO)_6$; vanadium hexacarbonyl, $V(CO)_6$; (ethylbenzene) chromium, $Cr([CH_3CH_2]_xC_6H_{6-x})_2$, (where x=0–4); (ethyl benzene) molybdenum, $Mo([CH_3CH_2]_xC_6H_{6-x})_2$, (where x=0–4); molybdenum chloride hexahydrate, $MoCl_3.6H_2O$; cyclopentadienyl molybdenum tricarbonyl, $CpMo(CO)_3$; iron chloride hexahydrate, $FeCl_3.6H_2O$; chromium chloride hexahydrate, $CrCl_3.6H_2O$; sodium borohydride, $NaBH_4$; and 1.0 M lithium triethyl borohydride in THF; were used as received from either Strem Chemicals, Inc. or Aldrich Chemicals. The solvents decalin, tetrahydrofuran (THF), and methanol were distilled over $CaH_2$ and degassed by bubbling argon through them for at least 5 hours.

Ultrasonic treatment was performed by means of a high intensity ultrasonic probe (Sonic and Materials, model VC-600, 0.5 in Ti horn, 20 kHz, 100 $Wcm^{-2}$) fitted with a booster (Ace Glass, Inc., model 9822-20).

Elemental analysis was performed using energy dispersive analysis x-ray (EDAX).

Transmission electron microscope (TEM) observations were carried out with a Hitachi H9000 uHR microscope.

All manipulations for the preparation of the powders were performed in a dry-box or by Schlenck line techniques.

The as-synthesized nanostructured powders may be further heat treated with forming gas (4% hydrogen or pure hydrogen gas) at 400° C.–600° C. for 1–4 hours, depending on the sample size. Alternatively, the powders are treated in a hydrogen retort (to maintain the carbon content in the powder to less than 1 weight %) for 1 hour at 420° C. with a hydrogen flow rate of 20 standard cubic foot per hour (SCFH).

Prior to consolidation (compaction), nanostructured powders were outgassed at 650° C. for 8 hours, until a vacuum of $10^{-4}$ torr was reached, to decompose and remove mineral oil on the particle surface.

Consolidation was carried out using a vacuum hot press (VHP). The as-synthesized alloy powders were transferred to a cylindrical steel die with a 17.7 mm diameter cavity in a dry-box. Prior to the transfer of the powders from the storage tube, the glove-box was evacuated and flushed with argon several times and then backfilled with argon to near ambient pressure. The die was filled with powder to a height of 32 mm after manual tapping and pressing in the glove-box. The filled die was enclosed in a plastic bag or wrapped in a nickel foil while still in the glove box, and then transferred to a VHP. The VHP was custom designed by Centorr as per Pratt and Whitney specifications. [Preferably, to retain the nanostructure, consolidation (compaction) is at low temperatures, in the range from about 400° C. to about 800° C. at about 230 to about 275 MPa for periods ranging from between 15 minutes to about 2 hours, followed by cooling in the press.

Scanning electron microscope (SEM) observations were carried out with a JEOL 6400 microscope with EDS and WDS attachments, or a Cambridge (Mark 250) electron microscope fitted with an x-ray analyzer. Specimens for observation were prepared by mechanical grinding, with final mechanical polishing carried out using alumina of about 0.1 micrometers.

High resolution transmission electron microscope (HRTEM) observations were carried out with a JEOL 4000 EX microscope, with an acceleration voltage of approximately 5000 volts for the ion machine and a carrier gas of argon. Specimens were initially polished with a dimple grinder, and finally prepared with an ion beam instrument, obtaining a final specimen thickness on the order of 30 micrometers.

The hardness of the samples were measured on a Clark microhardness tester (DMH-2) interfaced with a Compaq computer and software.

Synthesis of Pure Iron Nanopowders

EXAMPLE 1

Thermal Decomposition 50 g (0.255 mol) of $Fe(CO)_5$ was dispersed in 200 mL of decalin in a one-liter flask fitted with a condenser and gas inlet and outlet tubes connected to a mercury bubbler. The solution was refluxed under argon for 4 hours. The color of the solution turned dark and then black within a few minutes and this reaction mixture was refluxed until the formation of shiny metallic particles was observed on the walls of the reaction vessel. The reaction was then stopped when the refluxing solution was colorless. The decalin solvent was removed from the reaction flask via decantation and drying in vacuum. Fine black powders (Yield: 16.042 g, 93.2%) were then isolated from the reaction flask.

EXAMPLE 2

Sonochemical Synthesis

A dispersion of 15 g (0.076 mol) of $Fe(CO)_5$ in dry decalin was sonicated at 50% vibration amplitude for 6 hours at room temperature or at 0° C. in a sonochemical reactor fitted with a condenser and gas inlet and outlet tubes connected to a mercury bubbler. The color of the solution turned dark and then black within a few minutes and this reaction mixture was sonicated until the formation of shiny metallic particles was observed on the walls of the reaction vessel. The sonication was then stopped and the decalin solvent was removed from the reaction flask via vacuum distillation. Fine black powder (Yield: 3.881 g, 75.2%) remained at the bottom of the reactor, which was then isolated, transferred to a vial and coated with mineral oil before compaction.

Figure 3A:
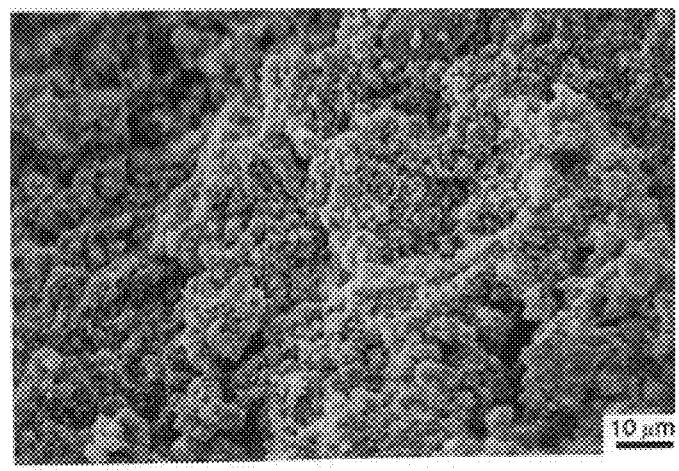
FIG. 3(A) is a photograph of a scanning electron microscope (SEM) view of an as-synthesized nanostructured iron powder synthesized by the sonochemical method according to the present invention.
Figure 3C:
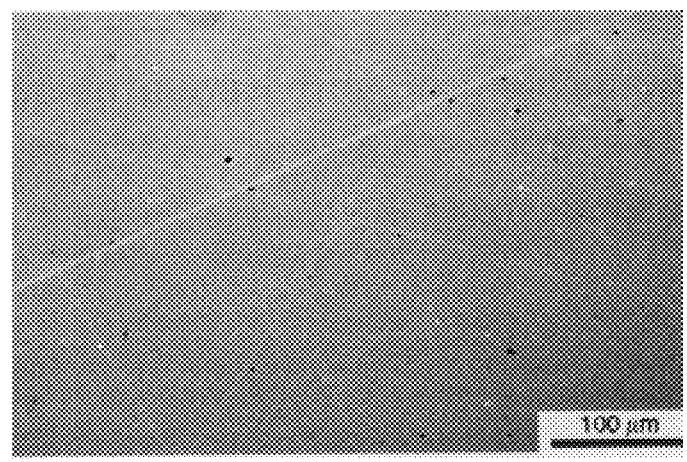
FIG. 3(C) is a photograph of an SEM view of a consolidated iron pellet synthesized by the sonochemical method according to the present invention.
Figure 3B:
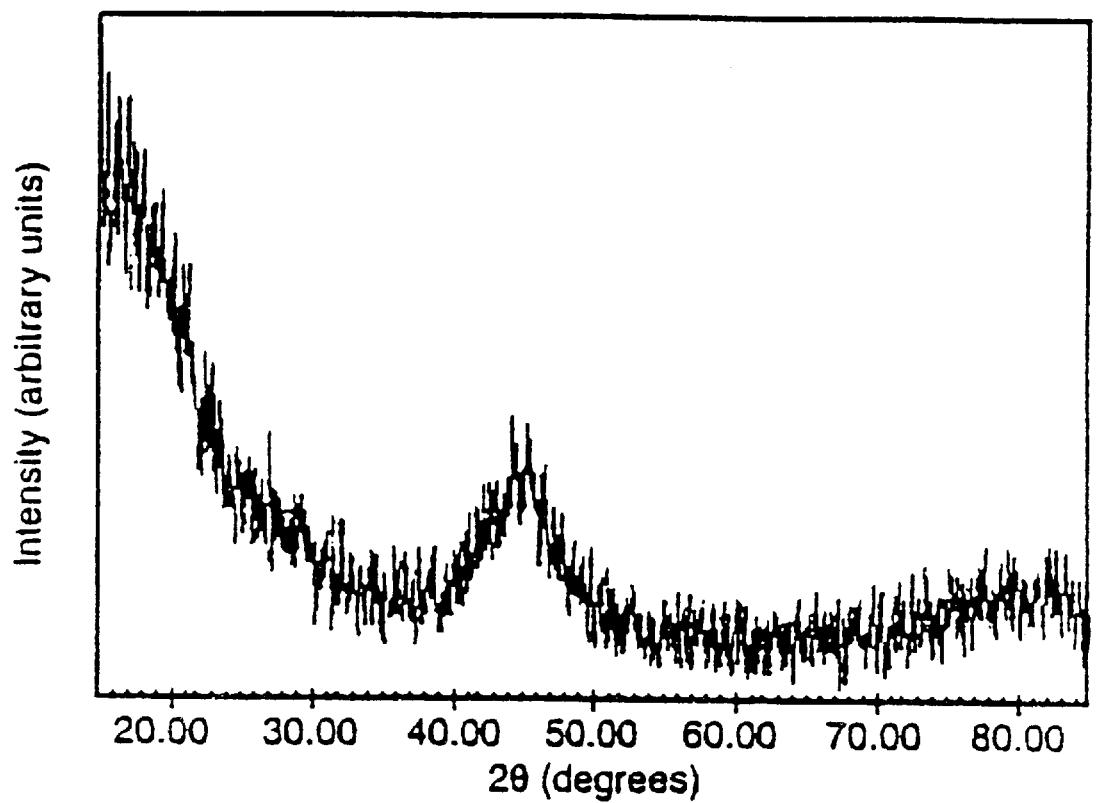
FIG. 3(B) is an x-ray diffraction spectrum of an as-synthesized iron powder synthesized by the sonochemical method according to the present invention.

As shown in FIG. 3(A), an SEM of the iron powder shows it to be amorphous. In the XRD spectrum shown in FIG. 3(B) the major peaks were assigned to the α-Fe phase and line broadening analysis revealed the average crystallite size in the consolidated specimen to be about 40 nm. The consolidated iron pellet had a homogenous microstructure as confirmed by SEM taken at 10033 magnification (FIG. 3(C)), and a density of 100%. The carbon and oxygen contents were determined to be 0.05% and 1.1%, respectively. The hardness of the consolidated iron sample was 37 Rockwell C (RC) as compared to that of conventional micron-sized iron compacts (4–5 RC).

Synthesis of Chromium, Molybdenum and Vanadium Metals by Reduction

EXAMPLE 3

Molybdenum

To a suspension of 5 g $MoCl_3$ in 25 mL of toluene, 74.13 mL of 1.0 M sodium triehyl borohydride in toluene was added slowly while stirring at room temperature by a liquid addition funnel in the dry-box. Slow effervescence was observed for a few minutes. After the reaction was stirred in the glove box for 48 hours at room temperature, a black suspension was formed. The powders were isolated by filtration and washing with subsequent washes of pentane (50 mL) and water (50 mL). The yield of the powders after the sublimation was 2.28 g (96.6%).

EXAMPLE 4

Chromium

To a suspension of 6 g $CrCl_3$ in 40 mL of toluene, 117 mL of 1.0 M sodium triehyl borohydride in toluene was added slowly while stirring at room temperature by a liquid addition funnel in the dry-box. Slow effervescence was observed for a few minutes. After the reaction was stirred in the glove box for 48 hours at room temperature, a black suspension was formed. The powders were isolated by filtration and washing with subsequent washes of pentane (60 mL) and water (60 mL). The yield of the powders after the sublimation was 1.56 g (93.9%).

EXAMPLE 5

Vanadium

To a suspension of 5 g $VCl_3$ in 30 mL of toluene, 95.81 mL of 1.0 M sodium triehyl borohydride in toluene was added slowly while stirring at room temperature by a liquid addition funnel in the dry-box. Slow effervescence was observed for a few minutes. After the reaction was stirred in the glove box for 48 hours at room temperature, a black suspension was formed. The powders were isolated by filtration and washing with subsequent washes of pentane (50 mL) and water (50 mL). The yield of the powders after the sublimation was 1.37 g (85.2%).

Synthesis of Iron and Chromium Carbides by Reduction

EXAMPLE 6

Iron Carbide

To a suspension of 8 g $FeCl_3$ in 100 mL THF, 147.95 mL of 1.0 M lithium triethyl borohydride in THF was added slowly while stirring at room temperature by a liquid addition funnel in the dry-box. Slow effervescence was observed for a few minutes. After the reaction was stirred in the glove box for 48 hours at room temperature, a black suspension was formed. The solvent (THF) was removed from the reaction flask by vacuum distillation and the black powders were washed with ≈200 mL of distilled degassed methanol till no further bubbling was observed. The fine black solid was washed again with 50 mL of THF and 50 mL of pentane and dried under vacuum. The lithium chloride by-product was removed from the above solid by vacuum sublimation in a tube furnace at 700° C./$10^{-4}$ torr for 6 hours. The yield of the powders after the sublimation was 2.68 g (97.3%).

EXAMPLE 7

Chromium Carbide

To a suspension of 5 g $CrCl_3$ in 100 mL THF, 105 mL of 1.0 M lithium triehyl borohydride in THF was added slowly while stirring at room temperature by a liquid addition funnel in the dry-box. Slow effervescence was observed for a few minutes. After the reaction was stirred in the glove box for 48 hours at room temperature, a black suspension was formed. The solvent (THF) was removed from the reaction flask by vacuum distillation and the black powders were washed with ≈200 mL of distilled degassed methanol till no further bubbling was observed. The fine black solid was washed again with 40 mL of THF and 40 mL of pentane and dried under vacuum. The lithium chloride by-product was removed from the above solid by vacuum sublimation in a tube furnace at 700° C./$10^{-4}$ torr for 6 hours. The yield of the powders after the sublimation was 1.43 g (86.1%).

Synthesis of Nanostructured M50 Steel

EXAMPLE 8

Thermal Decomposition 39.66 grams of $Fe(CO)_5$(0.2008 mol), 1.54 grams of $Mo(CO)_6$ (0.0096 mol), 2.12 grams of $Cr(CO)_6$(0.0059 mol), and 0.535 gram of $V(CO)_6$ (0.0025 mol) were dispersed in dry decalin (200 mL), in a one liter 3-neck flask equipped with a magnetic stirrer, a water cooled condenser, gas inlet and outlet tubes connected to a mercury check valve. The flask was placed in an oil bath and heated. (To ensure the uniform mixing of the starting compounds and complete decomposition of these carbonyls, solid crystals of these carbonyls as well as the liquid $Fe(CO)_5$ were first dispersed in decalin, followed by thermal decomposition into metallic powders.) The stirred solution was refluxed under argon at 80° C. for 10 hours. It was then heated to 160° C. for another 10 hours in an argon stream until decomposition of the carbonyls was completed, as evidenced by the formation of shiny black metallic powders. After cooling to near ambient temperature, decalin was removed via vacuum distillation, leaving a residue of black powders. These powders were next coated with deoxygenated mineral oil for further handling, and stored under argon in a Schlenk flask.

Figure 3D:
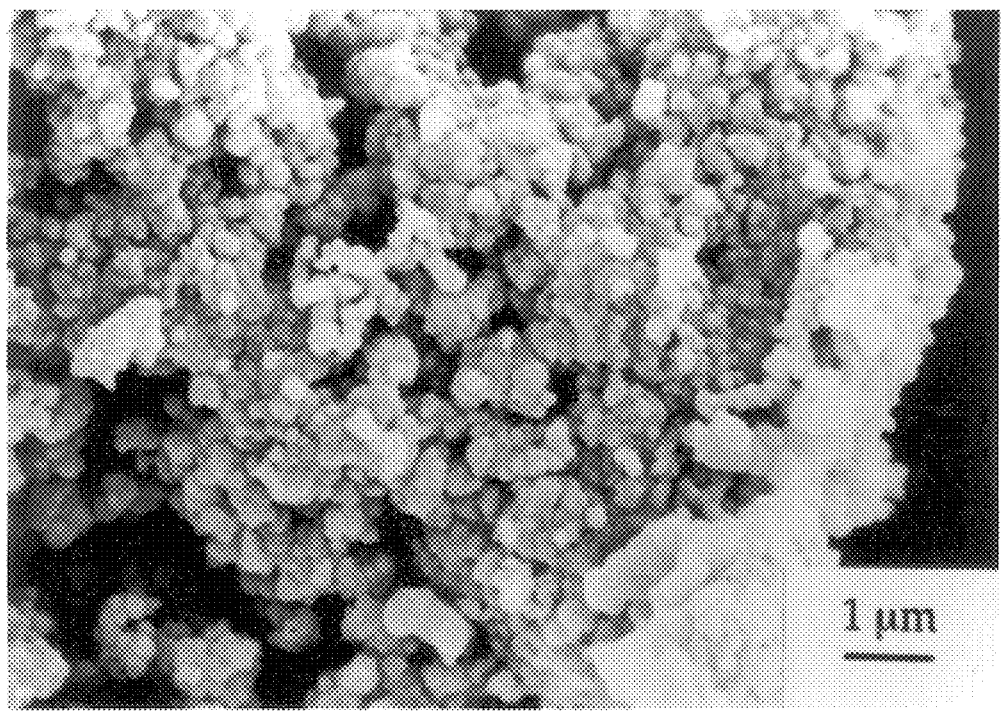
FIG. 3(D) is a photograph of an SEM view of an as-synthesized nanostructured steel alloy powder synthesized by the method according to the present invention.
Figure 4:
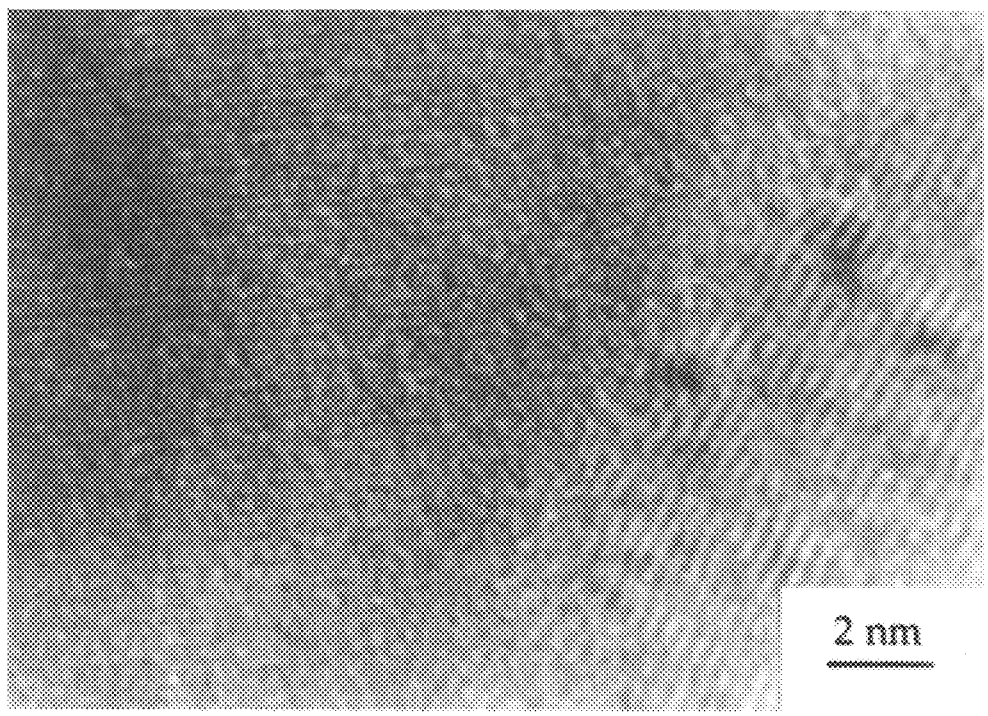
FIG. 4 is a photograph of a transmission electron microscope (TEM) view of an as-synthesized nanostructured steel powder synthesized by the method according to the present invention.

Elemental analysis of the powder derived from this example is as follows: 94.2% Fe, 0.3% Cr, 0.4% Mo, and 2.1% V. The compositional discrepancy between this composition and a typical M50 type alloy may be due to sublimation of $Cr(CO)_6$ and $Mo(CO)_6$ during the decomposition process. X-ray diffraction (XRD) analysis of the as-synthesized powders reveals peaks characteristic of amorphous materials. An SEM photograph of the powder is shown in FIG. 3(D) and illustrates that the powder has a porous structure, but gives no detailed information due to the very small particle size. A typical TEM micrograph of the powder is shown in FIG. 4, which reveals that these powders are nanostructured agglomerates, and each agglomerate is about 50 nm. Careful examination further reveals that these agglomerates are built-up from nanostructured particles of each about 4 nm. Both electron diffraction and HRTEM studies indicated that they are amorphous.

Figure 5:
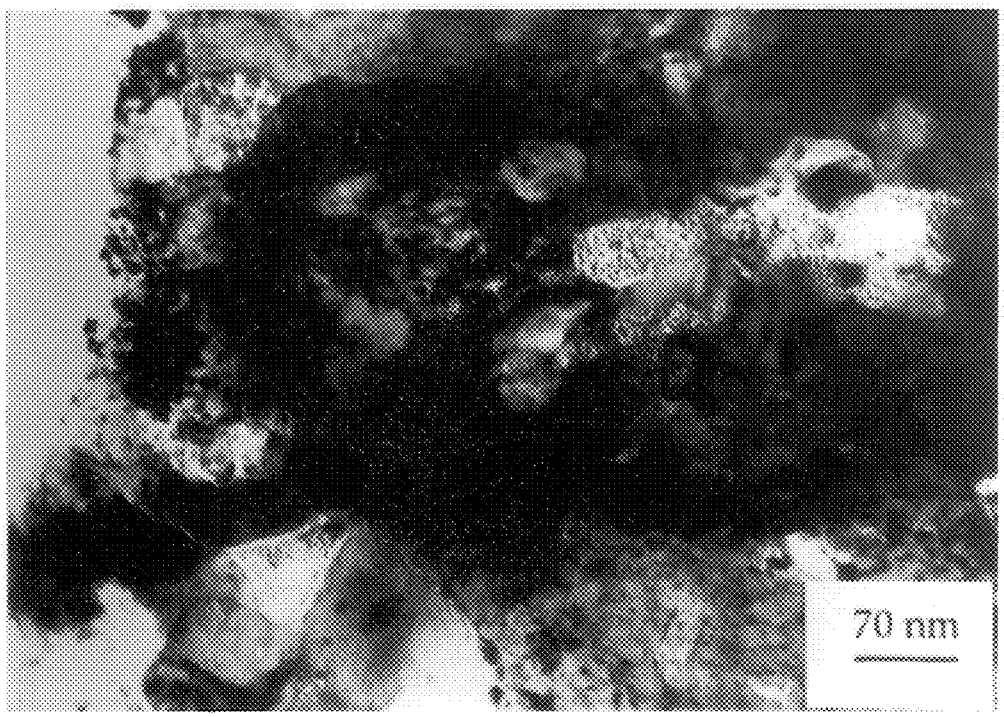
FIG. 5 is a photograph of a TEM view of a consolidated sample of a nanostructured steel alloy synthesized by the method according to the present invention.
Figure 6:
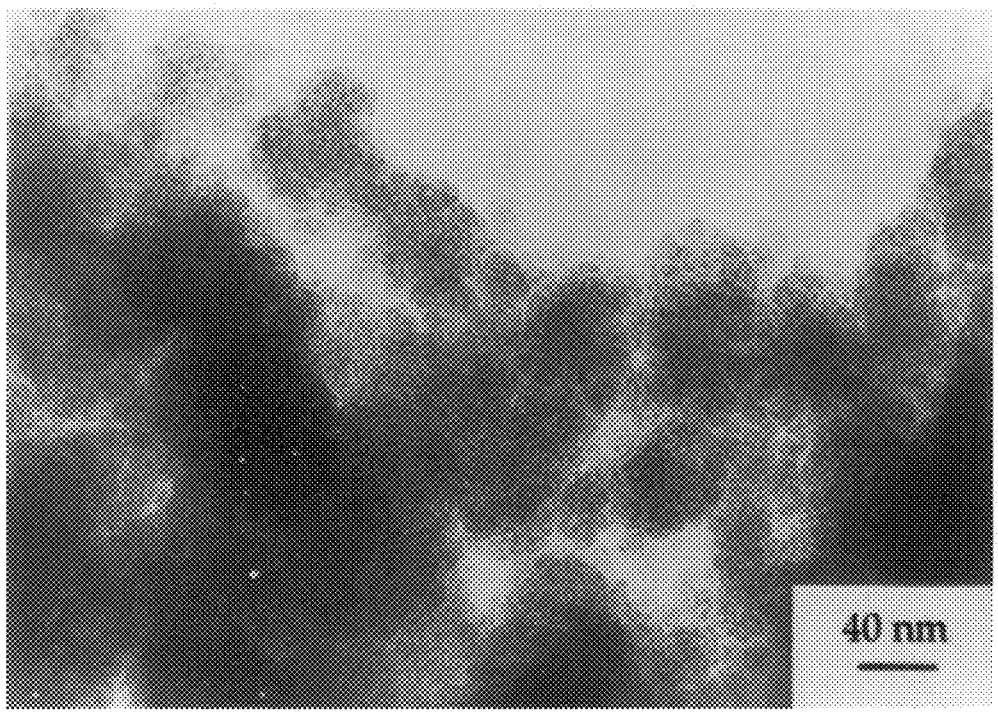
FIG. 6 is a photograph of a high resolution transmission electron microscope electron microscope (HRTEM) view of a consolidated sample of a nanostructured steel alloy synthesized by the method according to the present invention.

XRD analysis of the consolidated powders revealed the consolidated powders to be fully dense, nanostructured crystalline solids, with relatively sharp major peaks identified as -Fe, and minor peaks identified as a mixture of carbides. The average crystallite size calculated from the x-ray broadening analysis was about 45 nm for the powders obtained from the decomposition of carbonyls, and 70 nm for the powders obtained from the co-precipitation of the halides. A typical bright field TEM micrograph of the consolidated sample is shown in FIG. 5. It appears that there is a distribution in grain size, but the average grain size is about 50 nm. There is also a phase separation as revealed by the microstructural contrast. Electron diffraction also revealed that the alloy had a complex phase structure. A HRTEM micrograph of the consolidated sample is shown in FIG. 6. The lattice fringes seem complex and cannot be assigned to a pure iron phase. Crystalline grains as shown by the lattice fringes have an average size of about 22 nm. It was also observed that elongated nanograins existed with other more equiaxed crystallites. These elongated nanograins have, for instance, the dimension of 60 nm in length and 24 nm in width.

The nanostructured M50 compact had a hardness of 69 Rockwell C (RC) as compared to a hardness of 58–62 RC for conventional, commercial M50 steel.

EXAMPLE 9
Thermal Decomposition 20 g (0.152 mol) of $Fe(CO)_5$, 0.89 g of $Cr(Et_xC_6H_{6-x})_2$, (x=2–4) 1.00 g of $Mo(Et_xC_6H_{6-x})_2$ (x=2–4), and 0.22 g (0.001 mol) of $V(CO)_6$ was dispersed in 150 mL of decalin in a one-liter flask fitted with a condenser and gas inlet and outlet tubes connected to a mercury bubbler. The solution was refluxed under argon for 6 hours. The color of the solution turned dark and then black within a few minutes and this reaction mixture was refluxed until the formation of shiny metallic particles was observed on the walls of the reaction vessel. The reaction was then stopped when the refluxing solution was colorless. The decalin solvent was removed from the reaction flask via vacuum distillation. Fine black powders (Yield: 7.60 g, 99.0%) were then isolated from the reaction flask. These powders were then mixed in a high speed shaker (SPEX 8000 mixer/mill) at room temperature for 10 hours.

EXAMPLE 10
Thermochemical Decomposition

Iron pentacarbonyl (liquid) was mixed with vanadium carbonyl (solid), bis(ethylbenzene)chromium (liquid) and bis(ethylbenzene)molybdenum (liquid) in dry decalin. The mixture was maintained under an inert atmosphere of argon and stirring using an overhead mechanical stirrer at 140° C. for 12 hours and then at 180° C. for another 14 hours. At the end of this period, the reaction was complete as evidenced by the formation of a colorless liquid layer of decalin over the shiny black metal particles. The solvent was removed under reduced pressure, approximately 2 torr at 90° C. and the residue stored under argon.

EXAMPLE 11
Sonochemical Synthesis

A dispersion of 10 g (0.05 mol) of $Fe(CO)_5$, 0.44 g of $Cr(Et_xC_6H_{6-x})_2$, 0.50 g of $Mo(Et_xC_6H_{6-x})_2$ (x=2–4) and 0.11 g (0.00050 mol) of $V(CO)_6$ in dry decalin was sonicated at 40% amplitude for 8 hours and 40 minutes at room temperature in a sonochemical reactor fitted with a condenser and gas inlet and outlet tubes connected to a mercury bubbler. The color of the solution turned dark and then black within a few minutes and this reaction mixture was sonicated until the formation of shiny metallic particles was observed on the walls of the reaction vessel. The sonication was then stopped and the decalin solvent was removed from the reaction flask via vacuum distillation. Fine black power (Yield: 3.78 g, 98.5%) remained at the bottom of the reactor, which was then isolated, transferred to a vial and coated with mineral oil before compaction.

Figure 7:
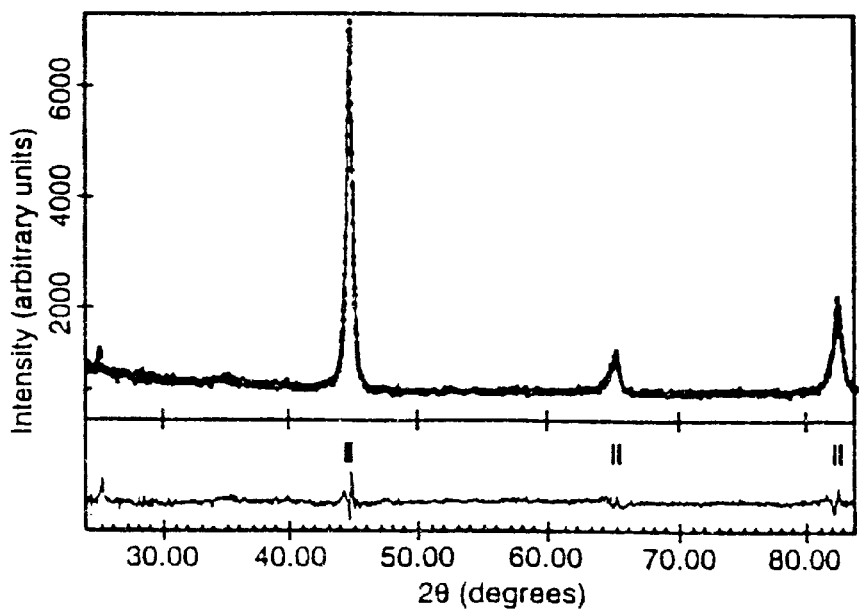
FIG. 7 is an X-ray diffraction spectrum of a consolidated M50-type steel alloy synthesized by the thermochemical method of the present invention.

The compacted M50 steel sample was found to be fully dense and the microstructure was, in general, homogenous with some segregation of Cr and Mo atoms. The XRD measurements showed that the as-synthesized powders were amorphous but the consolidated samples were crystalline with sharp peaks (FIG. 7). The major peaks were identified as α-Fe as confirmed by refinements of the diffraction patterns using the Rietveld method (J. Schneider, Acta Cryst. 1987, A43, p. 295). The experimental (dots) and calculated (continuous line) results are compared in FIG. 7 and the difference between the results is the continuous line at the bottom of the graphs.

The goodness of fit as calculated by the weighted pattern R-factors was found to be 9.04%. X-ray line broadening analysis revealed the average crystallite size of the consolidated specimen to be about 27 nm.

Figure 8:
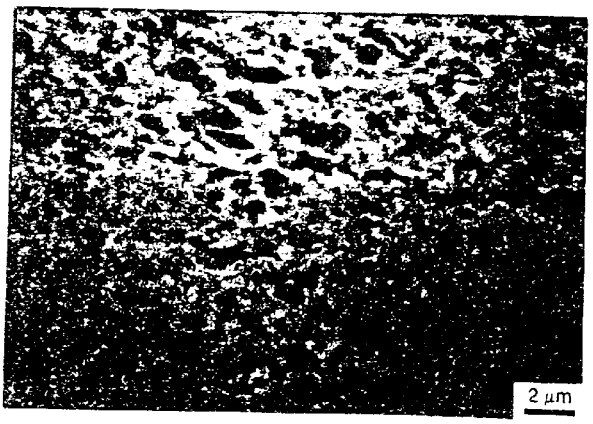
FIG. 8 is a photograph of an SEM view of a consolidated M50-type steel alloy synthesized by the thermochemical method of the present invention.
Figure 9:
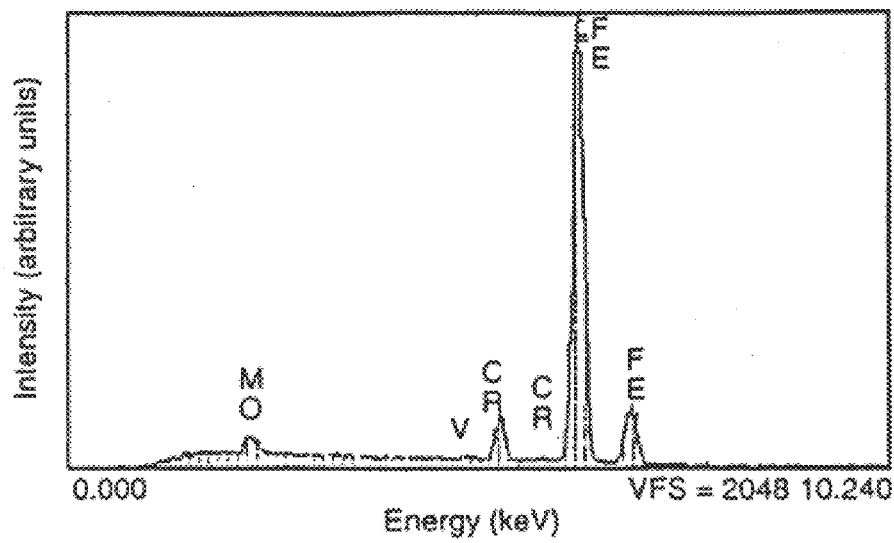
FIG. 9 is an EDAX spectrum of the same area of the consolidated M50-type steel alloy synthesized by the method of the present invention as is shown in FIG. 8.

FIG. 8 is an SEM micrograph of the compacted M50 steel specimen. It shows that the sample is dense and fairly homogeneous. Elemental analysis of the sample was performed using energy dispersive X-ray analysis (EDAX) (FIG. 9). The carbon content of the sample was determined to be 0.41% which is lower than the amount of carbon present in commercial M50 steel (0.8%). The hardness of the sample was found to be 66.3 RC. Conventional M50 steel has a hardness of 58–62 RC after tempering.

EXAMPLE 12
Sonochemical Synthesis

A dispersion of 20 g (0.10 mol) of $Fe(CO)_5$, 0.89 g of Cr $(Et_xC_6H_{6-x})_2$, 1.00 g of $Mo(Et_xC_6H_{6-x})_2$ (x=2–4) and 0.22 g (0.001 mol) of $V(CO)_6$ along with 1.5 g of polyoxyethylene sorbitan trioleate (surfactant) in dry decalin was sonicated at 50% amplitude for ≈6.5 hours at room temperature in a sonochemical reactor fitted with a condenser and gas inlet and outlet tubes connected to a mercury bubbler. The color of the solution turned dark and then black within a few minutes and this reaction mixture was sonicated until the formation of shiny metallic particles was observed on the walls of the reaction vessel. The sonication was then stopped and the decalin solvent was removed from the reaction flask via vacuum distillation. Fine black powder (Yield: 7.441 g, 96.9%) remained at the bottom of the reactor, which was then isolated, transferred to a vial and coated with mineral oil before the compaction.

Figure 10:
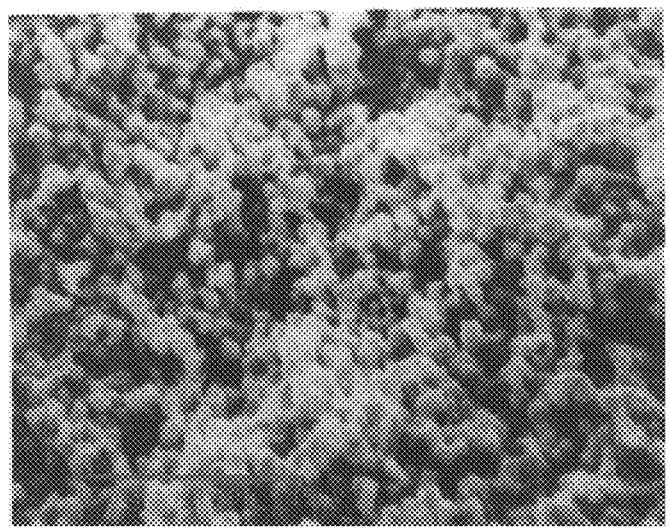
FIG. 10 is a photograph of an SEM view of a nanostructured M50 steel powder synthesized by the sonochemical method according to the present invention.
Figure 12:
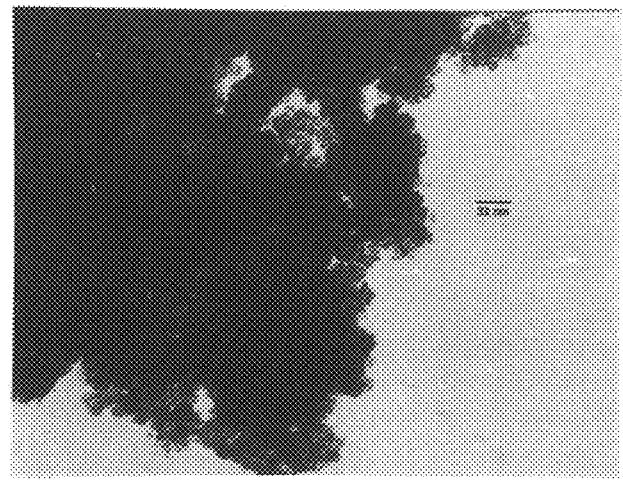
FIG. 12 is a photograph of a TEM view of a nanostructured M50 steel powder synthesized by the sonochemical method according to the present invention.
Figure 13:
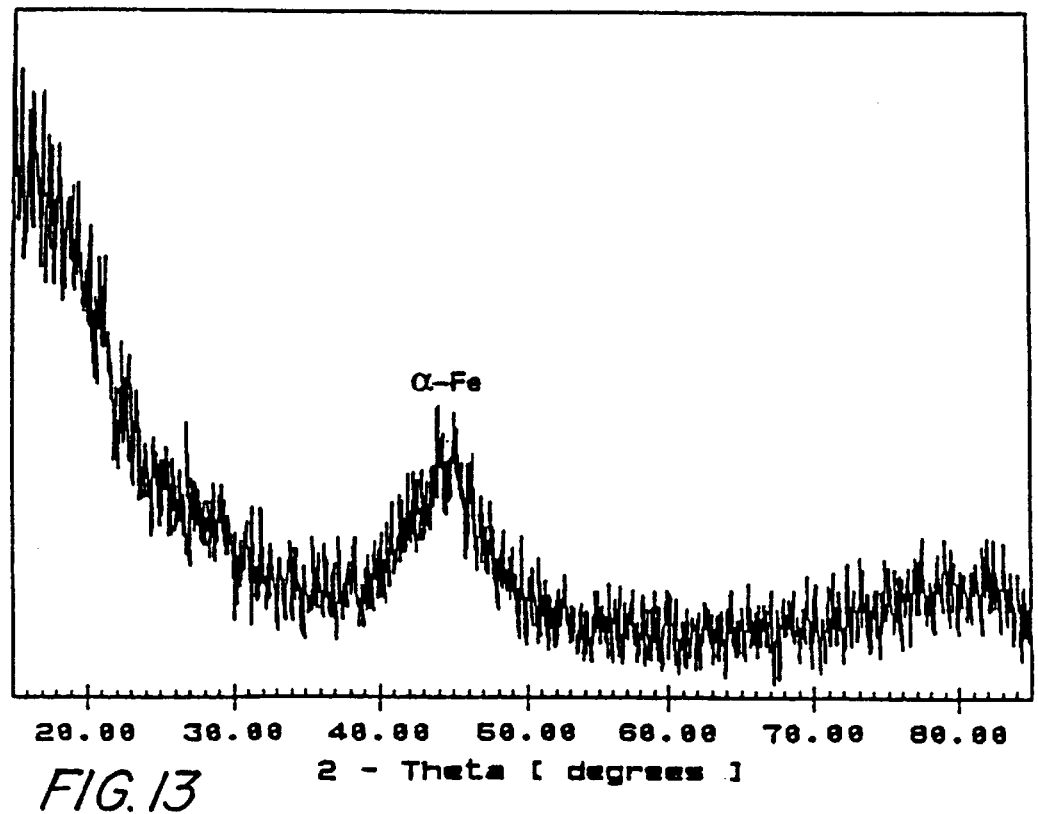
FIG. 13 is an X-ray diffraction spectrum of a nanostructured M50 steel powder synthesized by the sonochemical method according to the present invention.
Figure 14:
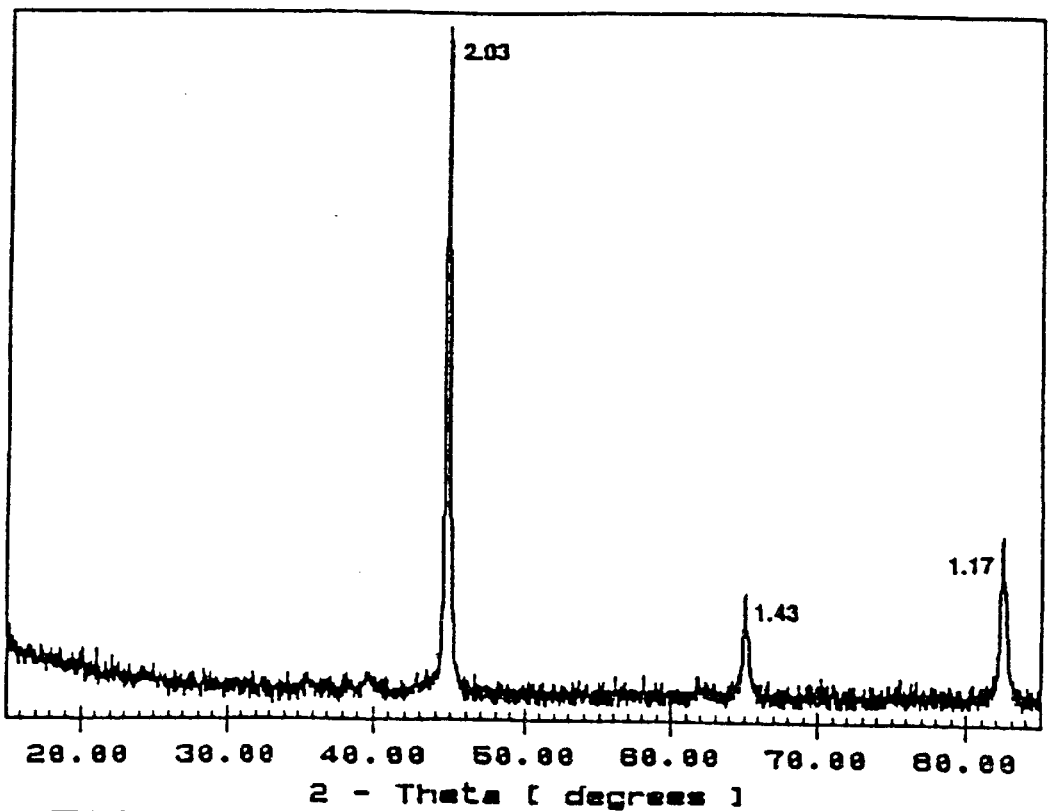
FIG. 14 is an X-ray diffraction spectrum of a consolidated M50-type steel alloy synthesized by the sonochemical method of the present invention.

The morphology and microstructure of the M50 steel powders produced by the ultrasound-assisted decomposition of metal-organic precursors were examined by SEM and TEM microscopy. The SEM micrograph of the as-synthesized powders at 4400× magnification shown in FIG. 10 indicates that the powders have a porous coral like microstructure usually observed for nanopowders produced by ultrasound decomposition. In the energy dispersive analysis by X-ray (EDAX) spectrum of the as-synthesized powder (FIG. 11), the peaks corresponding to Fe, Cr and Mo are observed. The TEM (FIG. 12) at 118,500× magnification showed that the particles were agglomerated and were composed of smaller particles. The XRD analysis indicated that the as-synthesized powders are amorphous as shown in FIG. 13. However, the consolidated sample displayed sharp crystalline peaks (FIG. 14) which were assigned to α-Fe as confirmed by refinements of the diffraction patterns using the Rietveld method. The average particle size calculated from X-ray line broadening analysis was 25 mn.

Figure 15:
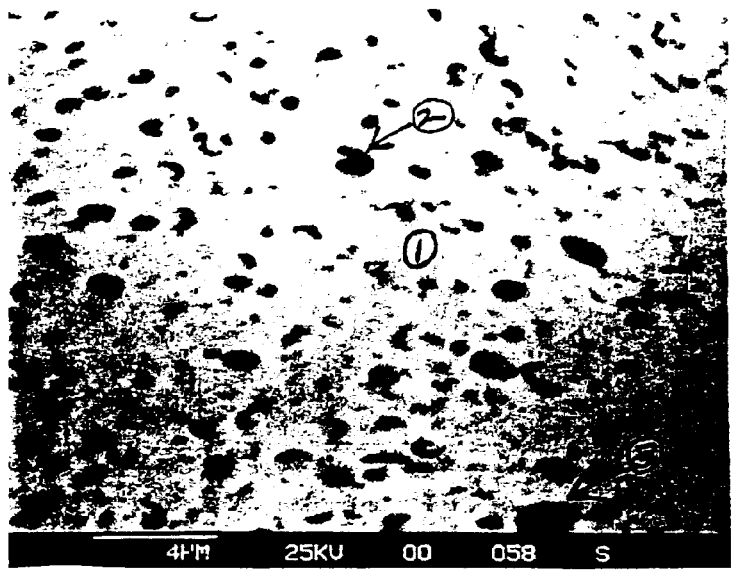
FIG. 15 is a photograph of an SEM view of a consolidated M50-type steel alloy synthesized by the sonochemical method of the present invention.
Figure 16A:
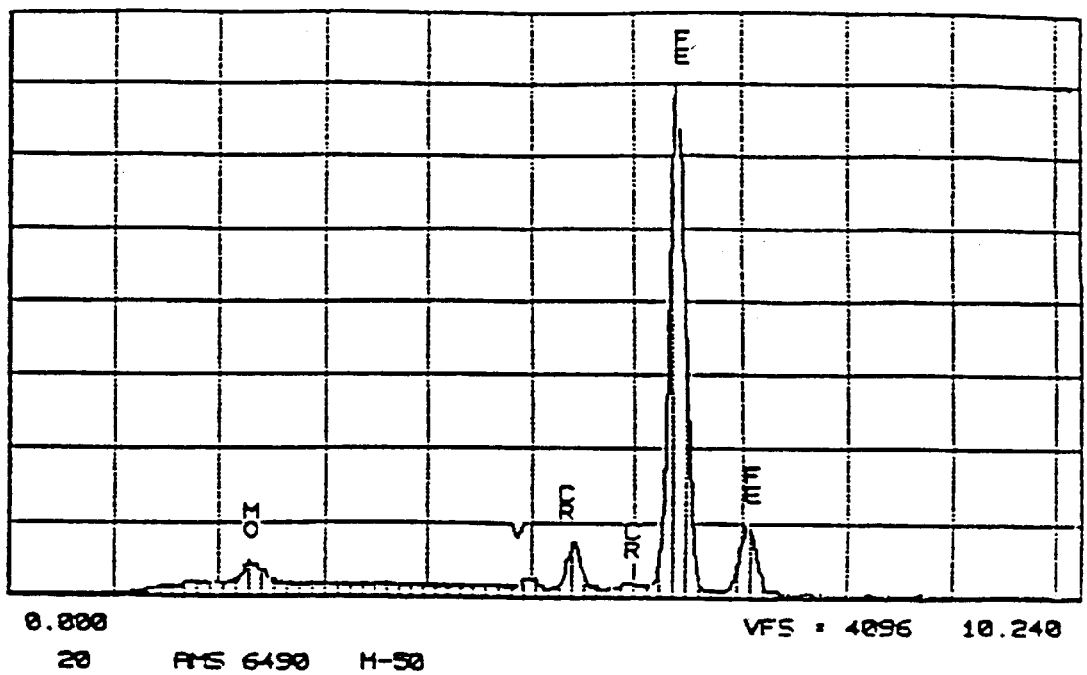
FIGS. 16(A)–(D) are EDAX spectra of (A) commercial M50 steel standard; (B) Spot 1 in FIG. 15; (C) Spot 2 in FIG. 15; and (D) Spot 3 in FIG. 15.
Figure 16B:
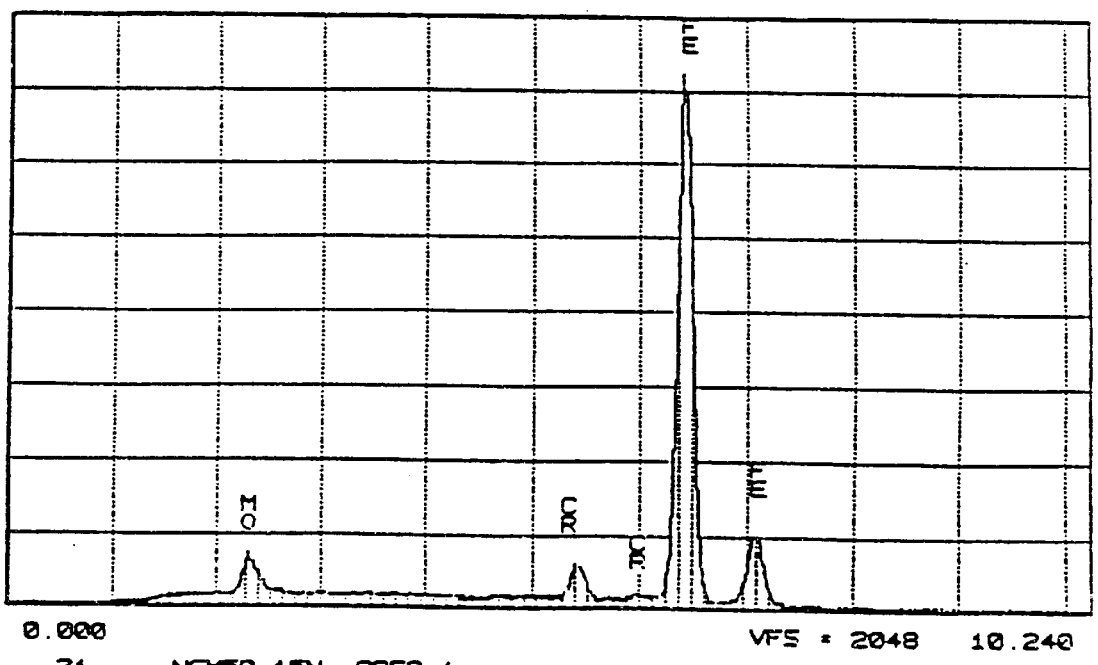
Figure 16C:
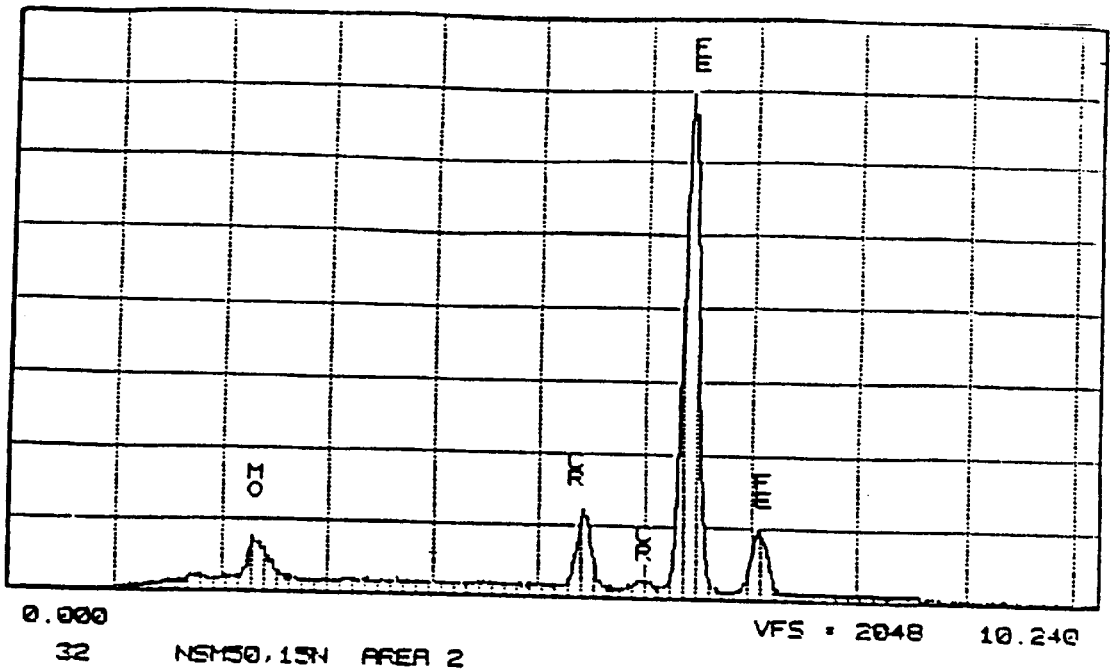
Figure 16D:
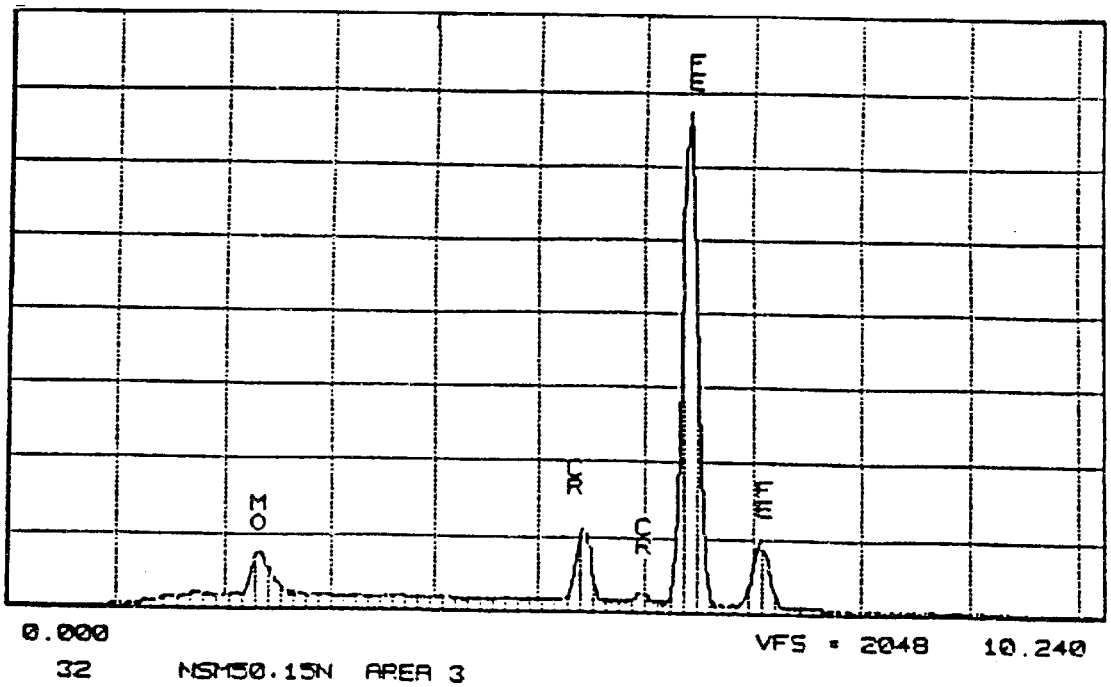

FIG. 15 shows a SEM micrograph of the compacted M50 steel specimen. Comparison of the FIG. 15 SEM micrograph with the corresponding EDAX spectra (FIGS. 16(A)–(D)) of the compact shows a uniform microstructure with scattered Cr-rich precipitations. The specimen is 100% dense. The carbon and oxygen content of the consolidated specimen was found to be 0.54% and 4.1% respectively.

Figure 17A:
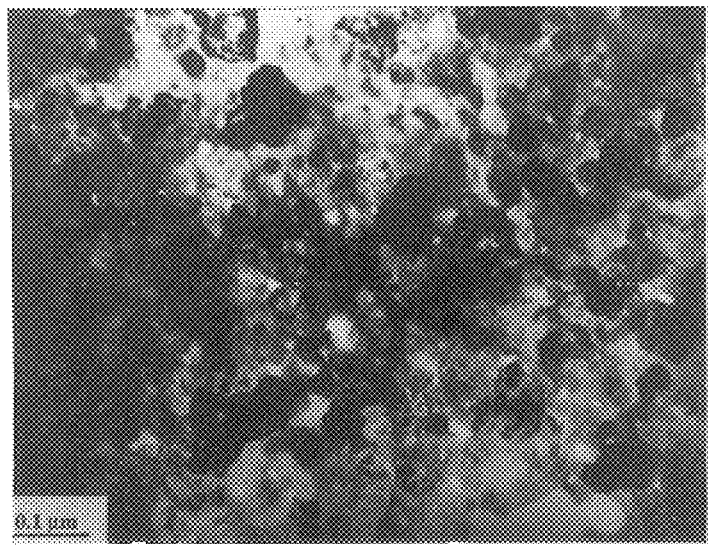
FIGS. 17(A)–(F) are photographs of TEM views of a consolidated M50-type steel alloy synthesized by the sonochemical method of the present invention, (A) being a bright field image of the matrix, (B) being a dark field image of the matrix, (C) being a diffraction pattern of the matrix, (D) being a dark field image of the precipitate, and (F) being a diffraction pattern of the precipitate and the matrix.
Figure 17B:
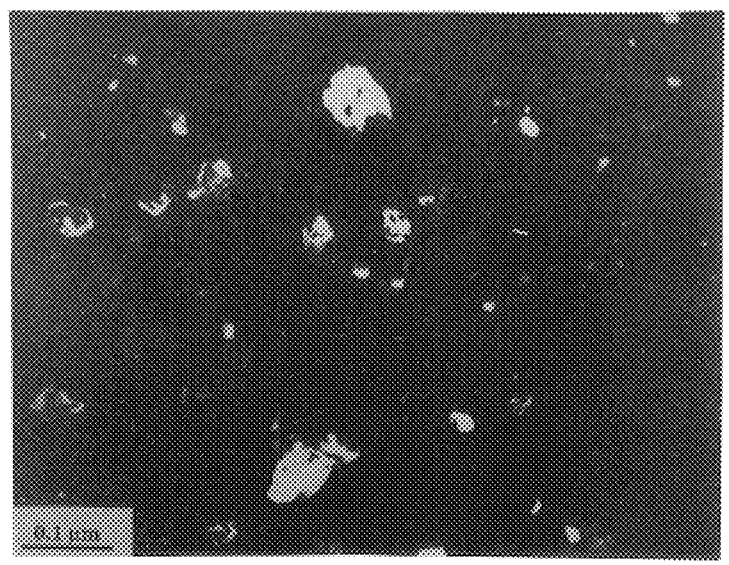
Figure 17C:
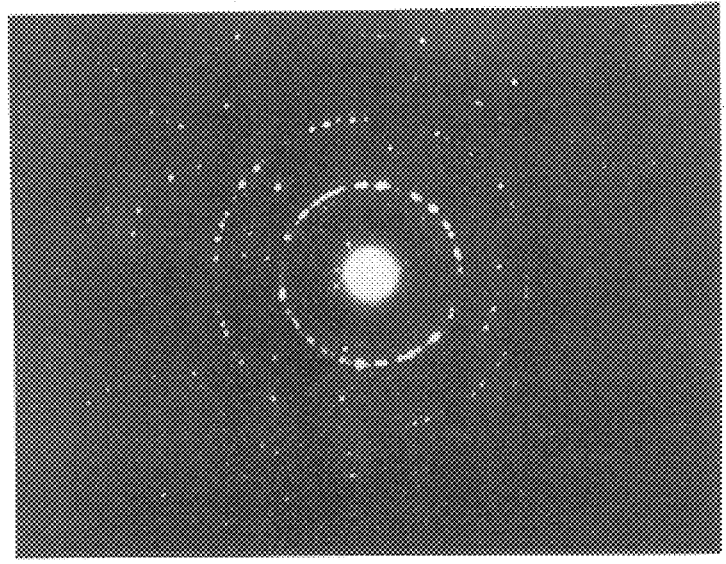
Figure 17D:
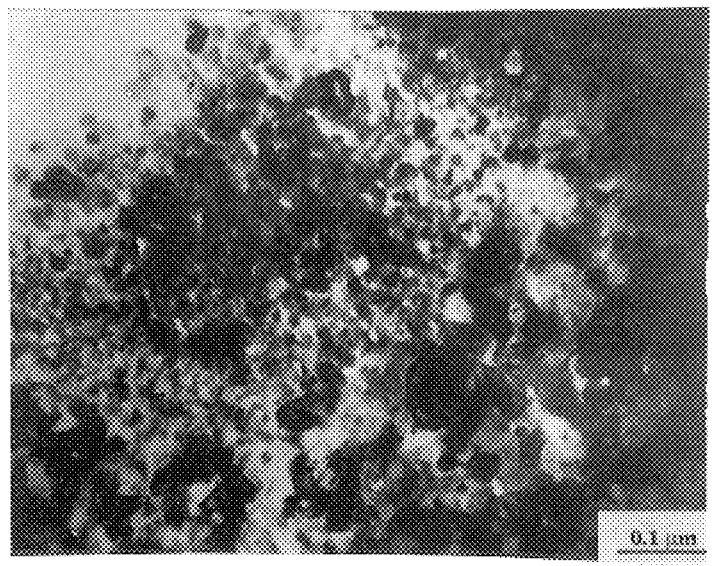
Figure 17E:
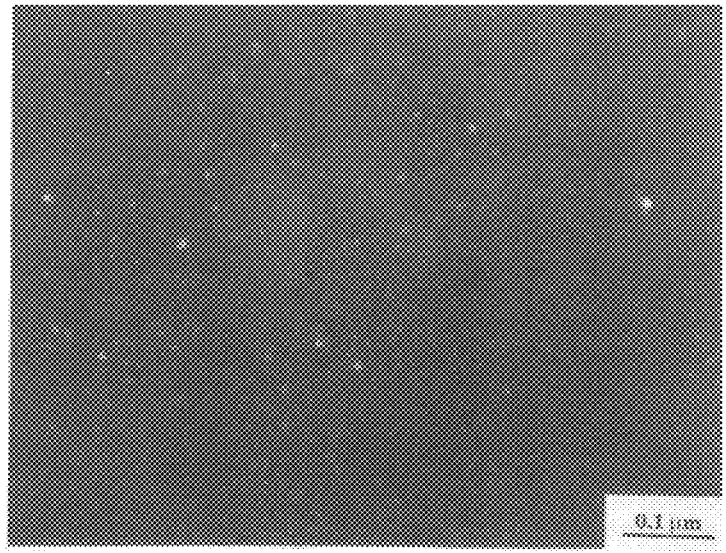
Figure 17F:
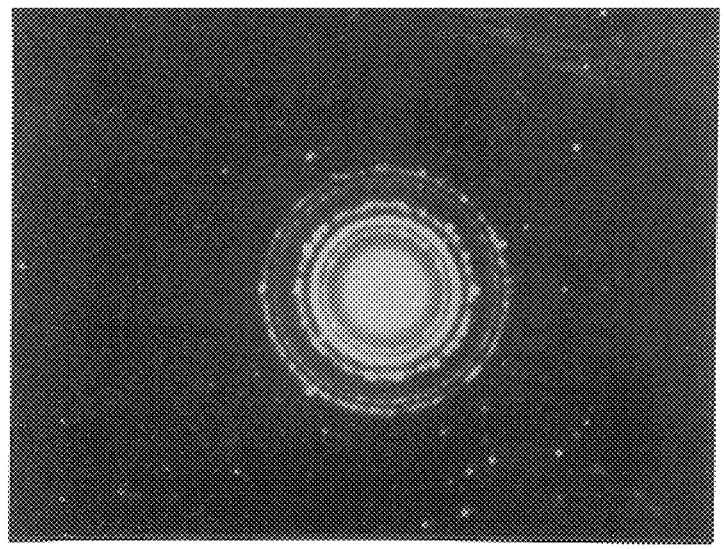

In FIGS. 17(A) and (B) is shown a bright field and dark field TEM micrograph respectively of the matrix in the consolidated sample. It appears that there is a distribution in grain size, and the range varies between 5 to 70 nm. TEM micrographs obtained by tilting the sample (+5° to –5°) in the same region confirmed that the microstructural contrast observed in FIG. 17(A) is mainly due to orientation effects of α-Fe crystallites although phase separation between the matrix and the precipitates could also contribute to this effect. The electron diffraction (FIG. 17(C)) of the matrix showed a spotty diffraction pattern corresponding the α-Fe bcc phase. FIGS. 17(D) and (E) show the bright field and dark field TEM micrographs of the precipitate, respectively. They indicate a very fine precipitate with diameters averaging approximately 10 nm. The electron diffraction pattern of the precipitate (FIG. 17(F)) indicated that it had a CF8 structure with the best fit corresponding to the $Mo_2C$ phase.

EXAMPLE 13
Sonochemical Synthesis with Surfactant

A dispersion of 20 g (0.10 mol) of $Fe(CO)_5$, 0.89 g of $Cr(Et_xC_6H_{6-x})_2$, 1.00 g of $Mo(Et_xC_6H_{6-x})_2$ (x=2–4) and 0.22 g (0.001 mol) of $V(CO)_6$ along with 1.5 g of polyvinyl pyrollidone (surfactant) in dry decalin was sonicated at 50% amplitude for ≈6.5 hours at room temperature in a sonochemical reactor fitted with a condenser and gas inlet and outlet tubes connected to a mercury bubbler. The color of the solution turned dark and then black within a few minutes and this reaction mixture was sonicated until the formation of shiny metallic particles was observed on the walls of the reaction vessel. The sonication was then stopped and the decalin solvent was removed from the reaction flask via vacuum distillation. Fine black powder (Yield: 6.441 g, 83.9%) remained at the bottom of the reactor, which was then isolated, transferred to a vial and coated with mineral oil before the compaction.

EXAMPLE 14
Co-Precipitation via Reduction With Sodium Borohydride $FeCl_3.6H_2O$, $CrCl_3.6H_2O$, and $MoCl_3.6H_2O$, were dissolved in deoxygenated water (500 mL) in the desired molar proportions, in a one liter 3-neck flask placed in an ice bath. The flask was equipped with gas inlet and outlet tubes, and a magnetic stir bar. The gas outlet tube was connected to a mercury check valve. Sodium borohydride ($NaBH_4$) solution was added slowly to the halide mixture via a pressure equalized addition funnel. The reduction was carried out under a stream of argon, with cooling as necessary. During the co-precipitation process, a black suspension was formed and hydrogen gas was evolved. The suspension was then stirred for another two hours to ensure the complete reduction of the halides. The powders were filtered and further washed several times with deoxygenated water under a stream of argon. After drying, vanadium hexacarbonyl and deoxygenated mineral oil were then added to the powder. The latter was done to ensure surface protection. The powders were stored in a Schlenk flask under argon.

Elemental analysis of the powder derived from this example is as follows: 87.7% Fe, 4% Cr, 4.5% Mo, and 1% V, which corresponds to the composition of commercial M50 steel. The physical characteristics of the consolidated powders obtained in this example were similar to those of the consolidated powder obtained by thermal decomposition (Example 8).

EXAMPLE 15
Co-Precipitation via Reduction with Lithium Triethyl Borohydride

To a suspension of 10 g $FeCl_3$, 0.36 g $MoCl_3$, 0.46 g $CrCl_3$ and 0.11 g $VCl_3$ in 100 mL THF, 206.9 mL of 1.0 M lithium triethyl borohydride in THF was added slowly by a liquid additional funnel in the dry-box while stirring at room temperature. Slow effervescence was observed for a few minutes. After the reaction was stirred in the glove box for 48 hours at room temperature, a black suspension was formed. The solvent (THF) was removed from the reaction flask by vacuum distillation and the black powders were washed with about 100 mL of distilled degassed methanol until no further bubbling was observed. The fine black solid was washed again with 50 mL of THF and dried under vacuum. The lithium chloride by-product was removed from the above solid by vacuum sublimation in a tube furnace at 700° C./$10^{-4}$ torr. The yield of the powders after the sublimation was 3.38 g (82.5%).

Figure 11:
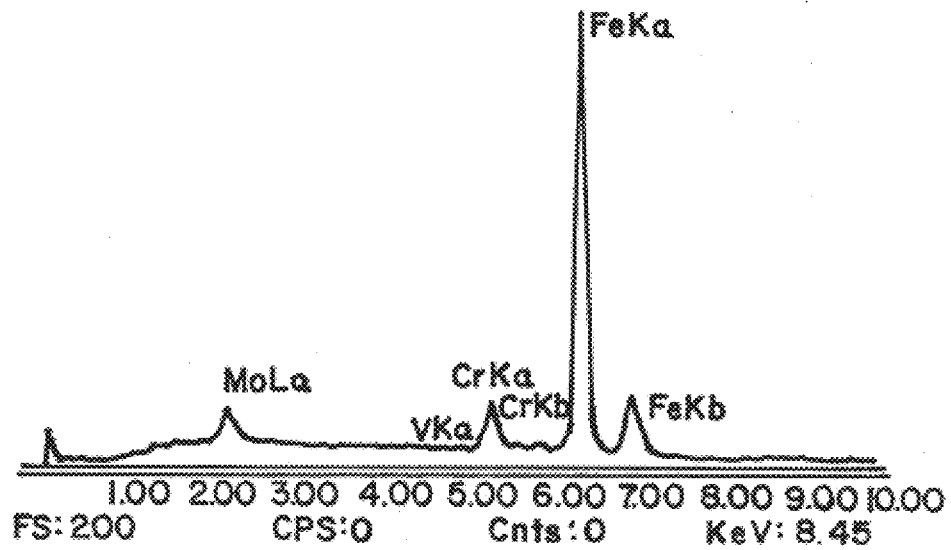
FIG. 11 is an EDAX spectrum of a nanostructured M50 steel powder synthesized by the sonochemical method according to the present invention.
Figure 18A:
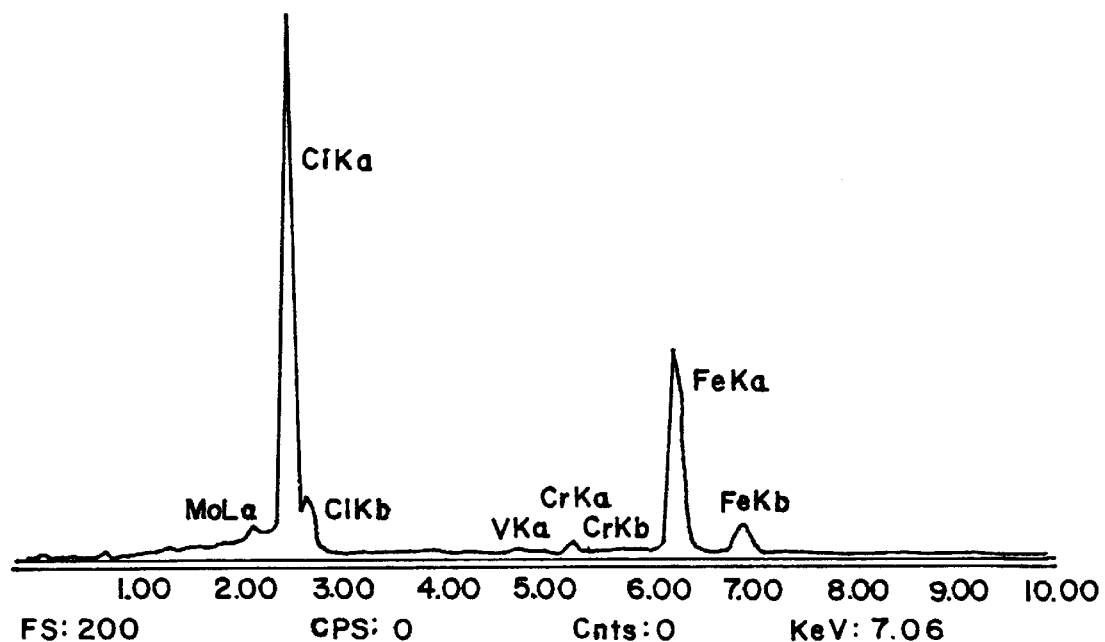
FIGS. 18(A)–(B) are EDAX spectra of nanostructured M50 steel powders synthesized by the chemical reduction method according to the present invention (A) before vacuum sublimation; (B) after vacuum sublimation at 650° C., $10^{-4}$ torr.
Figure 18B:
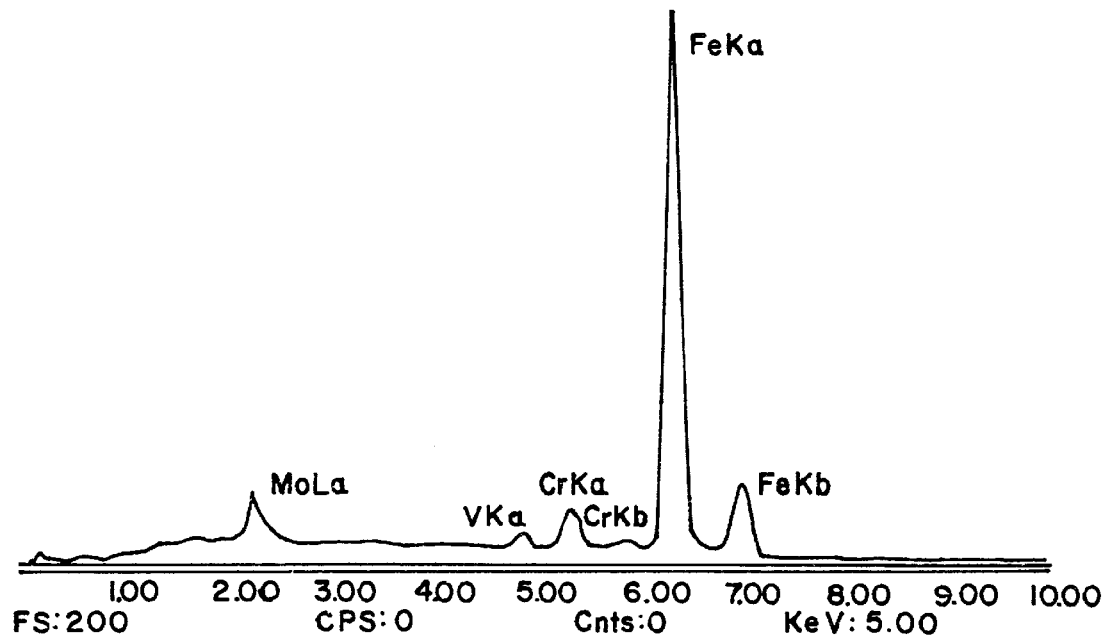

The SEM of the powders showed a similar porous coral-like morphology as shown in FIG. 11 for powders synthesized by the sonochemical method. In FIGS. 18(A) and (B) is shown the EDAX spectrum of the powders before and after the vacuum heat treatment at 650° C. It indicates that the lithium chloride by-product has been successfully removed by vacuum sublimation. The average particle size, calculated from X-ray line broadening analysis was 34 nm.

EXAMPLE 16
Thermal Decomposition of Aerosol

A fine aerosol of $Fe(CO)_5$, containing in addition precursors yielding Cr, Mo and V, is introduced into a hot zone (500° C.) via an ultrasonic nozzle. The corresponding powders are collected on a cold finger.

EXAMPLE 17
Dispersion of Chromium Molybdenum and Vanadium in an Iron Matrix 0.20 g of Mo, 0.17 g of Cr and 0.04 g of V nanopowders produced by the reduction method were mixed with 4.0 g of nanocrystalline Fe powder produced by the sonochemical decomposition of $Fe(CO)_5$, and ball-milled to produce M50 steel nanopowders.

Addition of Stabilizing Agents to Nanostructured Steel Powders

EXAMPLE 18
Synthesis of Nanostructured Aluminum Powder

One equivalent of $AlCl_3$ is reacted with four equivalents of $LiAlH_4$ in refluxing mesitylene, yielding a black precipitate. After the reaction is complete, the solvent is removed by vacuum distillation, yielding a powdery residue. The lithium chloride by-product is then removed by washing the powdery residue with pentane, followed by sublimation of the lithium chloride at 700° C. for 4 hours at $10^{-4}$ torr.

EXAMPLE 19
Synthesis Nanostructured Alumina Powder $Al(OC_4H_9)_3$ is first dissolved in isopropanol, and a sufficient amount of a solution of water in isopropanol (1:1 molar ratio) is added to induce hydrolysis. Approximately 10 volume percent of an acetic acid solution is then added to both induce hydrolysis and to control the rate and extent of condensation in the sol. After the gel has formed, it is dried first under vacuum, and then by calcining it in a furnace under an oxygen ambient for four hours at 200° C.

EXAMPLE 20
Synthesis of Nanostructured Aluminum Nitride Powder $AlCl3.6H_2O$ is mixed with deoxygenated water in a three-necked flask and stirred until it is dissolved. Anhydrous ammonia is then bubbled through the solution (1 L/minute) with vigorous stirring. The solution turns cloudy within a few minutes. The reaction temperature is then gradually increased to 90° C. over a period of 24 hours. The solution viscosity increases, and eventually a white gel forms. The reaction is completed by heating the mixture at 90° C., and bubbling ammonia gas through for a further 24 hours. Water is then removed from the pre-ceramic gel by vacuum distillation at $10^{-5}$ torr, followed by pyrolysis at high temperature (1050–1100° C.) for 10 hours under a continuous flow of anhydrous ammonia (1 L/minute).

EXAMPLE 21
Combining Nanostructured Al, Al2O3, AlN and Steel Alloy Powders

The powders from Example 9 were mixed with nanostructured Al, Al2O3, and AlN in a high-speed shaker (SPEX8000) for 24 hours in an argon atmosphere and then recovered in a glove box.

The methods of manufacture of nanostructured metals, metal carbides, and metal alloys of the present invention offer significant features and advantages over the prior art methods for the synthesis of nanostructured metals, metal carbides, and metal alloys. Chemical synthesis of such materials allows for greater homogeneity, control of stoichiometry, tailored synthesis and the cost-effective production of bulk amounts of materials. While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of preparing a nanostructured metal, metal carbide, or metal alloy comprising
    chemical synthesis of a nanostructured metal, metal carbide, or metal alloy powder by decomposition of metal precursors, wherein said precursors are a mixture comprising iron pentacarbonyl and compounds yielding chromium, vanadium and molybdenum and wherein said decomposition is by introduction of an aerosol containing said metal precursors into a hot zone via an ultrasonic nozzle; and
    consolidation of said powder to form a nanostructured metal, metal carbide, or metal alloy.

2. The method of claim 1, wherein:
    said hot zone is in the range from about 400° C. to about 1000° C.

3. A method of preparing a nanostructured metal, metal carbide, or metal alloy comprising
    chemical synthesis of a nanostructured metal, metal carbide, or metal alloy powder by decomposition of metal precursors, wherein said chemical synthesis is by precipitation or co-precipitation of at least one metal precursor; and
    consolidation of said powder to form a nanostructured metal, metal carbide, or metal alloy.

4. The method of claim 3, wherein:
    said co-precipitation is by reduction of at least one metal precursor by a reducing agent followed by addition of at least one metal carbonyl.

5. The method of claim 4, wherein:
    said reducing agent is selected from the group comprising sodium borohydride, sodium triethylborohydride, and lithium triethyl borohydride.

6. The method of claim 4, wherein:
    said a least one metal precursor comprises the hydrated chlorides of chromium, iron, and molybdenum, said reducing agent is sodium borohydride, and said metal carbonyl is vanadium hexacarbonyl.

7. The method of claim 4, wherein:
    said at least one metal precursors comprise the anhydrous chlorides of iron, molybdenum, and chromium, said reducing agent is triethylborohydride, and said metal carbonyl is vanadium hexacarbonyl.

8. The method of claim 3, wherein:
    said precipitation or co-precipitation is by reduction of at least one metal halide by a reducing agent.

9. The method of claim 8, wherein:
    said at least one metal halide is selected from the group comprising the chlorides of chromium, molybdenum, iron, and vanadium, and hydrates thereof.

10. The method of claim 8, wherein:
    said reducing agent is selected from the group comprising sodium borohydride, sodium triethylborohydride, and lithium triethyl borohydride.

11. The method of claim 8, wherein:
    said at least one metal halide comprises molybdenum trichloride, and said reducing agent comprises sodium triethyl borohydride.

12. The method of claim 8, wherein:
    said at least one metal halide comprises chromium trichloride, and said reducing agent comprises sodium triethylborohydride.

13. The method of claim 8, wherein:
    said at least one metal halide comprises vanadium trichloride, and said reducing agent comprises sodium triethyl borohydride.

14. The method of claim 8, wherein:
    said at least one metal halide comprises iron trichloride, and said reducing agent comprises lithium triethyl borohydride.

15. The method of claim 8, wherein:
    said at least one metal halide comprises chromium trichloride, and said reducing agent comprises lithium triethyl borohydride.

16. The method of claim 8, wherein:

said at least one metal halide comprises chromium trichloride, iron trichloride, molybdenum trichloride, and vanadium trichloride, and said reducing agent comprises lithium triethyl borohydride.

17. A method of preparing a nanostructured metal, metal carbide, or metal alloy comprising chemical synthesis of a nanostructured metal, metal carbide, or metal alloy powder by decomposition of metal precursors, wherein said nanostructured metal powder is a nanostructured steel powder, and further wherein said steel powder is obtained by the mixture of chromium, iron, molybdenum, and vanadium nanopowders; and consolidation of said powder to form a nanostructured metal, metal carbide, or metal alloy.

18. The method according to claim 17, wherein:

said nanostructured metal powder further comprises at least one compound selected from the group comprising nanostructured aluminum, aluminum nitride, and aluminum oxide powders.

19. A method of preparing a nanostructured metal, metal carbide, or metal alloy comprising chemical synthesis of a nanostructured metal, metal carbide, or metal alloy powder by decomposition of metal precursors; and consolidation of said powder to form a nanostructured metal, metal carbide, or metal alloy, wherein said consolidation is in a vacuum hot press.

20. The method of claim 19, wherein:

said consolidation is at a temperature in the range from about 400° C. to about 800° C., in the range from about 230 MPa to about 275 MPa, for a length of time in the range from about 15 minutes to about 2 hours.

21. A method for the manufacture of nanostructured metal carbide and metal alloy powders comprising:

providing at least one metal precursor; and decomposing said precursors by means of an effective amount of heat, ultrasound, or a combination thereof, said decomposition resulting in the production of a nanostructured metal carbide or metal alloy powder.

22. The method of claim 21, wherein:

said at least one metal precursor is selected from the group comprising metal carbonyls, cyclopentadienyl metal carbonyls, and ethylbenzene metals.

23. A method for the production of nanostructured metal, metal carbide, and metal alloy powders comprising:

providing at least one metal precursor wherein said precursors are a mixture comprising iron pentacarbonyl and compounds yielding chromium, vanadium and molybdenum; and decomposing said precursors by introduction of an aerosol containing said metal precursors into a hot zone via an ultrasonic nozzle.

24. The method of claim 23, wherein:

said hot zone is in the range from about 400° C. to about 1000° C.

25. The method of claim 21, wherein:

said metal precursor is iron pentacarbonyl.

26. A method for the manufacture of nanostructured metal, metal carbide, metal alloy powders comprising:

providing at least one metal precursor; and precipitating or co-precipitating at least one metal precursor, said precipitation or co-precipitation step resulting in the production of a nanostructured metal, metal carbide, or metal alloy powder.

27. The method of claim 26, wherein:

said precipitating or co-precipitating step is by reduction of said at least one metal precursor by a reducing agent, followed by addition of at least one metal carbonyl.

28. The method of claim 27, wherein:

said reducing agent is selected from the group comprising sodium borohydride, sodium triethylborohydride, and lithium triethyl borohydride.

29. The method of claim 27, wherein:

said a least one metal precursor comprises the hydrated chlorides of chromium, iron, and molybdenum, said reducing agent is sodium borohydride, and said metal carbonyl is vanadium hexacarbonyl.

30. The method of claim 27, wherein:

said at least one metal precursors comprise the anhydrous chlorides of iron, molybdenum, and chromium, said reducing agent is triethylborohydride, and said metal carbonyl is vanadium hexacarbonyl.

31. The method of claim 26, wherein:

said precipitating or co-precipitating step is by reduction of at least one metal halide by a reducing agent.

32. The method of claim 31, wherein:

said at least one metal halide is selected from the group comprising the chlorides of chromium, molybdenum, iron, and vanadium, and hydrates thereof.

33. The method of claim 31, wherein:

said reducing agent is selected from the group comprising sodium borohydride, sodium triethylborohydride, and lithium triethyl borohydride.

34. The method of claim 31, wherein:

said at least one metal halide comprises molybdenum trichloride, and said reducing agent comprises sodium triethyl borohydride.

35. The method of claim 31, wherein:

said at least one metal halide comprises chromium trichloride, and said reducing agent comprises sodium triethylborohydride.

36. The method of claim 31, wherein:

said at least one metal halide comprises vanadium trichloride, and said reducing agent comprises sodium triethyl borohydride.

37. The method of claim 31, wherein:

said at least one metal halide comprises iron trichloride, and said reducing agent comprises lithium triethyl borohydride.

38. The method of claim 31, wherein:

said at least one metal halide comprises chromium trichloride, and said reducing agent comprises lithium triethyl borohydride.

39. The method of claim 31, wherein:

said at least one metal halide comprises chromium trichloride, iron trichloride, molybdenum trichloride, and vanadium trichloride, and said reducing agent comprises lithium triethyl borohydride.

40. A method of producing a nanostructured steel powder, comprising:

providing nanostructured chromium, iron, molybdenum, and vanadium powders; and mixing said powders to form a nanostructured steel powder.

41. The method according to claim 40, wherein:

said nanostructured powders further comprise at least one nanostructured powder selected from the group comprising nanostructured aluminum, aluminum nitride, and aluminum oxide powders.

42. The method of claim 19, wherein:

said chemical synthesis is by decomposition of metal precursors.

43. The method of claim 42, wherein:

said decomposition is by an effective amount of heat, ultrasound, or a combination thereof.

44. The method of claim 19, wherein:

said metal precursors are selected from the group comprising metal carbonyls, cyclopentadienyl metal carbonyls, and ethylbenzene metals.

45. The method of claim 19, wherein:

said metal precursors are selected from the group comprising iron pentacarbonyl, molybdenum hexacarbonyl, chromium hexacarbonyl, vanadium hexacarbonyl, ethylbenzene chromium, ethylbenzene vanadium, and cyclopentadienyl molybdenum tricarbonyl.

* * * * *

UNITED STATES PATENT AND TRADEMARK OFFICE
CERTIFICATE OF CORRECTION

PATENT NO.     : 6,033,624
DATED          : March 7, 2000
INVENTOR(S)   : Kenneth E. Gonsalves et al.

It is certified that error appears in the above-identified patent and that said Letters Patent is hereby corrected as shown below:

<u>Column 1,</u>
Line 11, insert -- STATEMENT REGARDING FEDERALLY SPONSORED RESEARCH AND DEVELOPMENT
    This invention was made with Government support under grants "N00014-94-1-0579 and N00014-94-1-0833 awarded by the U.S. Office of Naval Research. The Government has certain rights in the invention. --

Signed and Sealed this

Twenty-sixth Day of August, 2003

JAMES E. ROGAN
*Director of the United States Patent and Trademark Office*